UNITED STATES PATENT OFFICE.

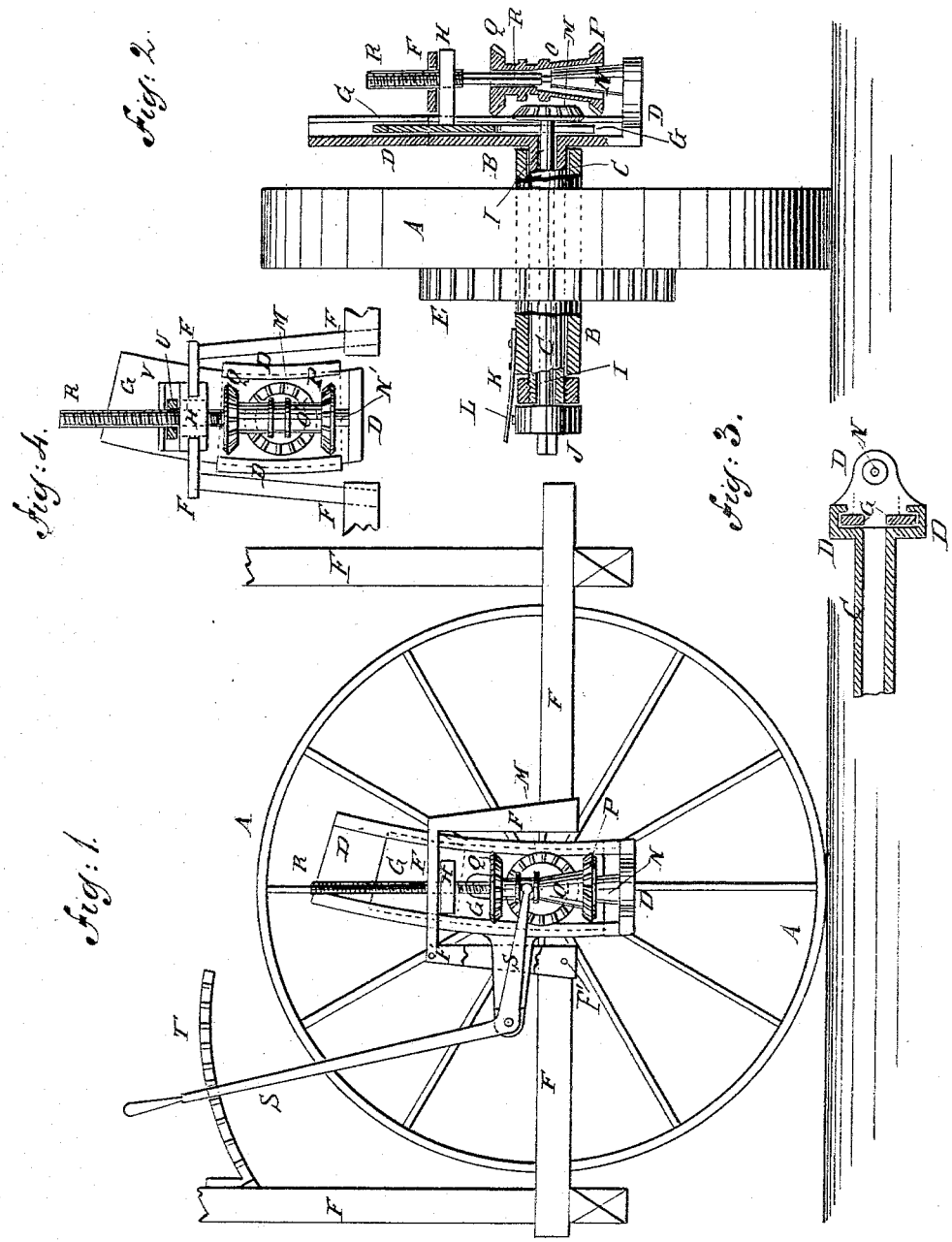

NEWTON W. MILLER, OF MARSHALL, INDIANA.

ADJUSTING MECHANISM FOR HARVESTERS.

SPECIFICATION forming part of Letters Patent No. 323,588, dated August 4, 1885.

Application filed October 4, 1884. (No model.)

*To all whom it may concern:*

Be it known that I, NEWTON W. MILLER, of Marshall, in the county of Parke and State of Indiana, have invented a new and useful Improvement in Adjusting Mechanism for Harvesters and other Machinery, of which the following is a full, clear, and exact description.

Reference is to be had to the accompanying drawings, forming part of this specification, in which similar letters of reference indicate corresponding parts in all the figures.

Figure 1 is a side elevation of my improvement shown as applied to the drive-wheel and frame of a harvester. Fig. 2 is a front elevation of the same partly in section. Fig. 3 is a sectional plan view of the hollow axle, its attached plate, and the sliding bar. Fig. 4 is a side elevation of a part of the improvement, showing a modification.

The object of this invention is to facilitate the vertical adjustment of harvesters and other machines mounted upon wheels.

The invention consists in the combination, with the drive-wheel, the hollow axle, and the frame of the machine, of a shaft working in the said hollow axle, a guide-plate attached to the said hollow axle, provided with a bearing, and carrying a sliding bar having an arm, a beveled gear-wheel attached to the said shaft, a hub, and beveled gear-wheels placed upon the said bearing, a pivoted screw, and an elbow-lever, whereby the said frame can be lowered and raised by turning the said shaft. The hub of the drive-wheel and the shaft are connected by a fastening, so that the said shaft will be turned to lower and raise the frame of the machine by the revolution of said drive-wheel, as will be hereinafter fully described.

A is the drive-wheel, the hub B of which revolves upon the hollow axle C. The inner end of the hollow axle C is formed upon or rigidly attached to the plate D, the lower end of which projects inward horizontally. The upright part of the plate D is curved slightly to correspond with the arc of the driving gear-wheel E of the machine, so that the gear-wheel connected with the frame F of the machine will not be thrown out of gear with the said driving gear-wheel by the vertical adjustment of the said frame.

Upon the side edges of the plate D are formed grooved flanges to form a way to receive the bar G, which is curved to correspond with the curvature of the said plate D.

To the bar G is attached an inwardly-projecting arm, H, upon which the frame F, or an offset of the said frame, rests, so that the frame F will be raised and lowered by raising and lowering the said bar G.

In the hollow axle C is placed a shaft, I, upon the outer end of which is secured a cap, J, which rests against the outer end of the said axle C, and has its outer end squared to receive a wrench, so that the said shaft I can be turned by hand, if desired, to adjust the frame F when the machine is stationary.

To the hub B of the drive-wheel A is attached a spring-latch, K, or other suitable fastening, to engage with the pin L, or other suitable catch attached to the cap J, so that the shaft I will be turned within the hollow axle C by the revolution of the hub B upon the said axle. The shaft I passes through a slot in the lower end of the bar G, and to the inner end of the said shaft is attached a beveled gear-wheel, M.

To the inwardly-projecting lower end of the plate D is attached a conical bearing, N, upon which is placed the conical hub O, to the lower and upper ends of which are attached beveled gear-wheels P Q, so that by moving the gear-wheels P Q up or down one or the other of the said gear-wheels can be made to mesh into the beveled gear-wheel M. The upper part of the bore of the hub O is made square to receive and fit upon the square lower part of the screw R, the lower end of which is rounded and rests and revolves in a socket in the upper end of the journal N. The screw-thread formed upon the upper part of the screw R fits into a screw-hole in the arm H of the bar G, so that the said arm and bar, and with them the frame F of the machine, can be raised and lowered by turning the said screw R.

With this construction, when the bar G and arm H are raised by turning the screw R forward, the rise of the hub O upon the tapering journal N allows the lower end of the hub O to swing to compensate for the movement of the said bar G and arm H along the curved guide-plate D, to prevent the said screw R from binding in the screw-hole in the said arm H.

Upon the middle part of the hub O is formed an annular groove to receive the forked end of the elbow-lever S, which is pivoted at its angle to a projection formed upon or attached to the plate D. The upper arm of the elbow-lever S moves along a catch-bar, T, attached to the frame F, so that the said lever will be held in any position into which it may be adjusted.

In the modification shown in Fig. 4 the journal N' and hub O' are made straight, and the arm H is attached to the frame F, and is slotted for the passage of the screw R, so that the said screw can remain vertical. In this case a nut, U, is placed upon the screw R, above or below the arm H, and which is connected with the said arm by keepers V or other suitable means so that it will support the frame F, and will slide upon the said arm H as the bar G moves along the curved guide D. With this construction, by operating the lever S to throw one of the gear-wheels P Q into gear with the gear-wheel M the frame of the machine will be lowered or raised, as may be desired, by the advance of the machine.

The mechanism is made self-controlling by pins or projections F' in the frame F, near the upper and lower corners of the offset passing over the beveled wheels, which pins or projections F' strike the lever S when the said frame is at the upper and lower limits of its movement and disengages the gear-wheels.

Having thus fully described my invention, what I claim as new, and desire to secure by Letters Patent, is—

1. The combination, with the drive-wheels A, the hollow axle C, and the frame F, of the shaft I, the guide-plate D, having bearing N, the sliding bar G, having arm H, the beveled gear-wheel M, the hub and beveled gear-wheels O P Q, the screw R, and the elbow-lever S, substantially as herein shown and described, whereby the said frame can be raised and lowered by turning the said shaft, as set forth.

2. The combination, with the hub B of the drive-wheel A, the hollow axle C, the shaft I, the guide-plate D, having bearing N, the sliding bar G, having arm H, the beveled gear-wheel M, the hub and beveled gear-wheels O P Q, the screw R, the frame F, and the elbow-lever S, of the fastening K L, substantially as herein shown and described, whereby the said shaft will be turned to lower and raise the said frame by the revolution of the said drive-wheel, as set forth.

NEWTON W. MILLER.

Witnesses:
HENRY B. CORD,
DAVID STROUSE.